US012611591B2

(12) United States Patent (10) Patent No.: US 12,611,591 B2
Müller et al. (45) Date of Patent: Apr. 28, 2026

(54) DEVICE AND METHOD FOR GENERATING CONTROL SIGNALS

(71) Applicants: Thomas Müller, Berlin (DE); André Frank, Neuenhagen (DE)

(72) Inventors: Thomas Müller, Berlin (DE); André Frank, Neuenhagen (DE)

( * ) Notice: Subject to any disclaimer, the term of this patent is extended or adjusted under 35 U.S.C. 154(b) by 223 days.

(21) Appl. No.: 18/666,668

(22) Filed: May 16, 2024

(65) Prior Publication Data

US 2024/0382835 A1 Nov. 21, 2024

(30) Foreign Application Priority Data

May 17, 2023 (DE) ..................... 10 2023 113 126.5

(51) Int. Cl.
A63F 13/22 (2014.01)
A63F 13/24 (2014.01)
(52) U.S. Cl.
CPC .............. A63F 13/22 (2014.09); A63F 13/24 (2014.09)
(58) Field of Classification Search
None
See application file for complete search history.

(56) References Cited

U.S. PATENT DOCUMENTS

2020/0385956 A1* 12/2020 Krivenkov ............. G05G 9/047
2020/0406128 A1* 12/2020 Nakagawa ........... A63F 13/285
2021/0178260 A1* 6/2021 Huang .................. A63F 13/426
2022/0404856 A1* 12/2022 Dorn ...................... G05G 9/047

FOREIGN PATENT DOCUMENTS

DE 102016222231 B3 3/2018
DE 202018100806 U1 6/2018
DE 102019115329 A1 12/2020
DE 112020004035 T5 5/2022
DE 102015213200 C5 8/2022
DE 102021115884 A1 12/2022
WO 2017009406 A1 1/2017
WO 2021038935 A1 3/2021

* cited by examiner

*Primary Examiner* — Stephen T. Reed
(74) *Attorney, Agent, or Firm* — McCoy Russell LLP

(57) ABSTRACT

This disclosure relates to a device for generating control signals, comprising an actuating element which for generating the control signals is adjustable along at least one adjustment direction into a plurality of adjustment positions, and at least one actuating drive which is adapted and provided to apply a restoring force onto the actuating element at an actual position in the direction of a target position specified by a control unit.

12 Claims, 4 Drawing Sheets

DEVICE AND METHOD FOR GENERATING CONTROL SIGNALS

CROSS REFERENCE TO RELATED APPLICATION

The present application claims priority to German Patent Application No. 10 2023 113 126.5 filed on May 17, 2023. The entire contents of the above-listed application are hereby incorporated by reference for all purposes.

TECHNICAL FIELD

This disclosure relates to a device for generating control signals and to a method as described herein.

BACKGROUND

Known devices for generating control signals have an actuating element, such as a control stick, which can be adjusted along two adjustment axes within an adjustment range. In general, the control stick has a central rest position. Examples of such devices are described in documents DE 20 2018 100 806 U1 and DE 10 2019 115 329 A1. On adjustment of the control stick by an adjusting force applied by a user from a rest position into an (other) actual position, spring forces are applied to the control stick, which represent a counterforce perceptible for the user and acting against his adjusting force. With his adjusting force, the user always must compensate the counterforce in order to maintain the actual position.

SUMMARY

For an authentic actuating experience it is desirable that the counterforce is as constant as possible in its amount independently of the actual position so that the user has to compensate as small amounts as possible of changes in the counterforce. The counterforce can be generated in the form of a pretensioning force e.g. by pretensioned coil springs which can provide an (almost) constant spring characteristic along the adjustment axes and within the adjustment range, i.e. the spring force is almost constant over the deflection of the respective spring (instead of rising e.g. with increasing distance of the actual position from the rest position). Thus, even with small deflections out of the rest position a counterforce is applied already, which for a user does not represent a perceptible difference to a counterforce in the case of further deflections.

There are application scenarios of the device in which it is desirable to support the user in carrying out an adjusting movement on a first adjustment axis without any deviations in the direction of a second adjustment axis. This is made possible by a pretensioned spring.

One example is flying a loop in model flying. The adjustment axes here frequently are used to control elevator and aileron of an aircraft. When flying a loop it is important to only actuate the elevator. An actuation of the aileron, which is triggered by a deviation of the adjusting movement from the adjustment axis for the elevator, leads to a change in position of the aircraft along its longitudinal axis so that deviations from an ideal shape of the loop are obtained.

On the other hand, a known disadvantage of providing a constant counterforce along the adjustment axes consists in that a total counterforce vector resulting from a superposition of the counterforces (almost constant in their amount and their direction) along the two adjustment axes points towards the central rest position only in exceptional cases. Such an exceptional case does exist when the actual position lies on an adjustment axis or a bisector between the adjustment axes. For a user of the device, this behavior manifests itself as a perceptible imbalance on actuation of the control stick. When attempting to move the control stick on a circular path around the rest position, the imbalance leads to the fact that unexperienced users, who are not able to manually compensate the imbalance, describe a rhombus rather than a circle, wherein tips of the rhombus are arranged on the adjustment axes.

Against this background, it is the object underlying the disclosure to provide a device for generating control signals, which provides for an improved user experience.

According to a first aspect of the disclosure, this object is achieved by a device for generating control signals that includes an actuating element which for generating the control signals is adjustable along at least one adjustment direction into a plurality of adjustment positions. At least one actuating drive of the device is adapted and provided to apply a restoring force onto the actuating element at an actual position in the direction of a target position specified by a control unit. The control unit is adapted and provided to specify the target position and/or the restoring force as a function of one or more of an adjustment speed of the actuating element, an acceleration of the actuating element, at least one actual position preceding the actual position, a distance between the actual position and a nearest target position candidate from a field of target position candidates and/or the actual position, wherein specifying the target position and/or the restoring force as a function of the actual position additionally depends on a proportionality factor whose own value is dependent on the actual position.

In addition, the control unit can be adapted and provided to specify the target position and/or the restoring force as function of time.

The actuating element for example can be a control stick. The plurality of adjustment positions into which the actuating element can be adjusted can define a (one-dimensional or two-dimensional) adjustment range for the actuating element. Due to the adjustment of the actuating element, which in general is effected by an adjusting force applied by a user, a control signal associated to the adjustment position taken can be generated. On the basis of the control signals a control function on an object to be controlled can be triggered. In order to accomplish this, control signals generated in this way, for example, can be provided to an actuator which is adapted and provided to trigger the control function on the object to be controlled on the basis of the control signals. The object to be controlled for example can be a motor vehicle, an aircraft or a model aircraft. In the case of the aircraft, the device can be provided for example on a fly-by-wire control system. In the case of the model aircraft, a control function for example can comprise an adjustment of an aileron and/or an adjustment of an elevator of the model aircraft. In general, the device can be used as a remote control for a real or virtual object, which in particular is movable.

With the restoring force, the above-described counterforce can be provided, which the user can compensate with his adjusting force in order to manually hold the actuating element at the actual position. The restoring force can be provided by the at least one actuating drive in the form of a regulated, motor-generated force. In so far, it can also be understood as a regulator force. The restoring force in general is used to signal to the user in what direction a rest position or a neutral position of the actuating element is arranged. The rest position for example is a central position within the adjustment range.

The control unit can improve a qualitative experience of the user when using the device by specifying the target position. The restoring force therefor is applied onto the actuating element (exactly) in the direction of the target position. Moreover, an amount of the restoring force can be used to improve a quantitative experience of the user when using the device. Therefore, it is desirable in principle to be able to specify an arbitrary target position and/or an arbitrary restoring force by means of the at least one actuating drive in order to cover arbitrary user scenarios. The specification of the target position and/or the restoring force here can be effected in a control cycle of far below 1 ms (depending on the capacity of the microelectronics used). The restoring force here can be varied in terms of its amount and its direction.

When specifying the target position and/or the restoring force as a function of the adjustment speed of the operating element it can be taken into account how fast and in what direction the actuating element is adjusted by the user (possibly, the adjustment speed has the shape of a vector with a direction and an amount). In this way, different actuating scenarios can be distinguished. For example, a slow adjusting movement can require a restoring force smaller in its amount than in the case of a fast adjusting movement, because the user wants to perform the slow adjusting movement as unhindered as possible. In a video game, this can facilitate precise aiming with a reticle which is moved with the slow adjusting movement.

Using the acceleration of the actuating element for specifying the target position and/or the restoring force can have the advantage that high adjustment speeds can be detected as soon as they arise, and the target position and/or the restoring force can be specified for a high adjustment speed by way of precaution and appropriately.

The control unit also can be adapted and provided to distinguish an actuation of the actuating element by a user from an actuation by the at least one actuating drive due to the restoring force on the basis of the acceleration. A criterion for the distinction for example can be the amount of a change in the acceleration within a specified time interval (e.g. more than 5 ms). In general, a user cannot cause a constant acceleration over a specified time interval for physiological reasons. On the other hand, when the actuating element is released by the user at the actual position, the restoring force can cause a constant acceleration in the direction of the target position. Therefore, the control unit furthermore can be adapted and provided to reduce the restoring force in response to the determination of a constant acceleration of the actuating element. This can reduce the risk of the actuating element swinging open independently around the target position.

The control unit can be adapted and provided to specify an adjustment path along which the actuating element is to be moved by a user. The specification of the adjustment path can comprise a specification of an adjustment speed and an acceleration, in particular along one or more portions of the adjustment path. Furthermore, the control unit can be adapted and provided to specify a target position and/or a restoring force in the case of a deviation of an adjusting movement of the user from the specified adjustment path in such a way that the actuating element is adjusted back to the specified adjustment path. A control unit adapted in this way for example can provide for an application of the device in the medical area (rehabilitation, physiotherapy, etc.). The user here can move the actuating element with a body part, e.g. his hand, along an adjustment path (e.g. a circular path) specified for a therapy. At portions of the adjustment path where the user actuates the actuating element in a way that deviates from the specification (e.g. describes a dent in the circular path or unintentionally brakes the adjusting movement), a target position and/or a restoring force can be specified, which corrects the deviating actuation in order to achieve a therapeutic goal.

The device can comprise a measuring device which is adapted and provided to measure an adjustment path along which a user has moved the actuating element following an adjustment path specified (for achieving a therapeutic goal). The measured adjustment path can be evaluated for therapeutic purposes. The device furthermore can include a memory device which is adapted and provided to store the measured adjustment path as a reference path. The reference path here can be characterized by a position, a speed and/or an acceleration of the actuating element during a time interval. In particular, the reference path can be characterized by at least one actual position. The control unit can be adapted and provided to specify the target position and/or the restoring force as function of at least one reference path. The measuring device and/or the memory device can be part of an evaluation unit.

Taking account of at least one actual position preceding the actual position can be used to include a movement history of the adjusting movement into the specification of the target position and/or the restoring force. As a result, e.g. specified movement patterns can be recognized and a user scenario adapted thereto can be provided.

When a field of target position candidates is provided and the target position and/or the restoring force is used as a function of the distance between the actual position and a nearest target position candidate from the field of target position candidates, an adaptation of the device to a predetermined intended use can be achieved in a particular way. Such an intended use for example can represent a navigation in an electronic menu. The target position candidate nearest to the actual position is a target position candidate whose distance to the actual position is smallest. When there are two or more target position candidates whose distance to the actual position is identical, the target position can be selected from among the two or more target position candidates, e.g. on the basis of the movement history. Moreover, a restoring force can each be associated to the target position candidates from the field of target position candidates. In this way, a user of the device can distinguish target positions with reference to the restoring forces. By associating different restoring forces to target position candidates, hierarchical structures among the target position candidates can be represented haptically. The target position candidates can represent e.g. topics and associated sub-items of the electronic menu. The field of the target position candidates can be one-dimensional (e.g. in the manner of a ratchet) or two-dimensional (e.g. in the manner of a matrix).

In one embodiment, the control unit is adapted and provided to specify the target position and/or the restoring force as function of the actual position. For example, within the adjustment range a portion of possible actual positions can be defined, on taking of which by the actuating element a displacement of the target position is performed. Via the specification of the restoring force, in particular of its amount, force fields of arbitrary shape can be generated in the adjustment range, which differ by different restoring forces.

Specifying the target position and/or the restoring force as a function of the actual position additionally can depend on a proportionality factor whose own value (in turn also) is dependent on the actual position. Via the specification of the proportionality factor, the displacement of the target position can be scaled (arbitrarily) in dependence on the actual position and/or a force field of arbitrary shape can be generated in the adjustment range. For example, a set of proportionality factors can each be defined for an adjustment range, wherein each set corresponds to a force field by which the actuating element can be adjusted. With the force fields, spring characteristics of arbitrary springs can also be reproduced. A user experience when operating the device hence can be matched precisely.

The proportionality factor can be understood in such a way that a strength of the dependence of the target position and/or the restoring force on the actual position can be adapted therewith. In this sense, the proportionality factor can represent a kind of coupling strength of the actuating element to the target position. A possibility for calculating e.g. the restoring force K is the equation K=(S−I)*P(I) with the target position S, the actual position I and the proportionality factor P, wherein the subtraction S−I provides a distance of the actual position from the target position. K, S and I here can be scalars or (in particular two-dimensional) vectors. Accordingly, the proportionality factor is offset against the actual position and/or a distance of the actuating element from the target position, in order to determine the restoring force. The proportionality factor here is indicated as a function of the actual position. For example, the proportionality factor can be specified in discrete numbers for different adjustment positions or portions of the adjustment range (e.g. quadrants of a coordinate system or even finer portions). For example, from a particular deflection of the actuating element (e.g. S−I=400 steps, wherein at 1000 steps a maximum deflection and thus a limit of the adjustment range is reached) the proportionality factor can rise drastically (e.g. from 0.05 to 0.15). As a result, the restoring force likewise can multiply drastically from a deflection of 400 steps (e.g. increase threefold). In this way, a freely configurable force field can be created, in which for each adjustment position of the adjustment range (e.g. a two-dimensional field) an associated proportionality factor is stored in the control unit (e.g. in a memory device). Alternatively or additionally, the proportionality factor can be calculated from the distance of the actual position to the target position as a mathematical function. A proportionality factor which indicates a strength of the dependence of the target position on the actual position can be specified in the same way in terms of numbers or as a mathematical function.

A use of an arbitrary combination of the described function parameters adjustment speed, acceleration, movement history, distance, actual position, proportionality factor and time likewise is conceivable and possible. For example, a temporally oscillating restoring force can be combined with a displacement of the target position along the vector of the adjustment speed during a movement history whose evaluation results in the fact that the actuating element crosses an adjustment axis along a circular path around the target position. In particular, the specification of a periodically varying target position and/or a periodically varying restoring force can easily be modulated on existing specifications.

In one embodiment, the actuating element can be adjusted within an adjustment range which is defined by two orthogonal adjustment axes. The adjustment range here can represent a portion of a spherical surface. The actuating element can protrude from the adjustment range along a radius of the sphere. It can be pivotable about the adjustment axes for adjustment. The two adjustment axes above all can be orthogonal to each other in their projection on a tangential plane at the sphere. In principle, the adjustment range can be defined by an individual adjustment axis. The adjusting movement of the actuating element can then be effected in one dimension. In the case of an adjustment range defined by two adjustment axes, the adjusting movement can be effected in two dimensions.

In one embodiment, an actuating drive is provided for each adjustment axis, which is adapted and provided to apply a restoring force to the actuating element along the respective adjustment axis so that a total restoring force is obtained in the direction of the target position specified by the control unit. In this sense, restoring forces of two actuating drives can add up. The restoring force generated by a first actuating drive along a first adjustment axis can form a first total component of the total restoring force. The restoring force generated by a second actuating drive along a second adjustment axis can form a second total component of the total restoring force. In particular, the control unit can be adapted and provided to specify a restoring force on the basis of a first restoring function by means of the first actuating drive, and specify a restoring force on the basis of a second restoring function by means of the second actuating drive. The first and the second restoring function here can represent e.g. arbitrary spring characteristics. With such a control unit, different spring characteristics hence can be specified for example along the adjustment axes. Moreover, the first and the second restoring function can be adapted dynamically (e.g. to desired user scenarios in video games).

The two total components of the total restoring force can form a vector whose direction points towards the target position and whose amount is specified by the amount of the two total components. The resulting total restoring force thus can represent a vector addition, wherein an amount of the total restoring force K_g can result from the amounts of the restoring forces along the adjustment axes K_x, K_y according to the Pythagorean theorem ($K\_g^2=K\_x^2+K\_y^2$).

In one embodiment, the actual position and the target position each have a first and a second position component along the first and the second adjustment axis. Via the position components, they can be localized within the adjustment range. In this embodiment, the adjustment speed can include a first and a second speed component along the first and the second adjustment axis. Thus, the adjustment speed can be understood as a vector whose direction indicates the direction of an adjusting movement of the actuating element by the user. In this embodiment, the control unit can be adapted and provided to maintain the target position at a first speed component of zero (or within a specified threshold range close to zero), when the first position components of the actual and target positions are equal (or almost equal within a specified threshold range), and to specify a target position shifted along the second adjustment axis in the direction of the second speed component, when the second position components of the actual and target positions are equal (or almost equal within a specified threshold range).

The specification to maintain the target position when the first speed component is zero and the first position components of the actual and target positions are equal, is based on the consideration that during a movement of the actuating element along the first adjustment axis a counterforce as homogeneous as possible (in terms of direction) should be provided to a user of the device so that the desired movement along the first adjustment axis is possible undisturbed.

The specification of the shifted target position, when the first speed component is zero and the second position components of the actual and target positions are equal, on the other hand is based on the consideration that during an adjusting movement with which the user adjusts the actuating element through the first adjustment axis, a restoring force at least partly pointing in the adjustment direction is desirable. By shifting the target position, a homogeneous perception of the counterforce is provided when crossing the first adjustment axis.

For example, the user in this way can adjust the actuating element on a circular path around a target position, which is arranged at the origin of the adjustment axes. When approaching the first adjustment axis, the total restoring force can have a second total component greater than zero so that the actuating element is at least partly pretensioned in the direction of the first adjustment axis. The user then can perceive a pull forward towards the first adjustment axis. When the actuating element now is adjusted to the first adjustment axis, the second total component is zero (or close to zero within a specified threshold range), because the second position components of the actual and target positions are equal. The user then can perceive no more pull in the direction of the first adjustment axis. During a further adjustment beyond the first adjustment axis, the total restoring force can have a second total component of less than zero (reversal of the direction of force). For the user, the transition can be expressed by a noticeable threshold during the adjusting movement of the actuating element across the first adjustment axis, because after crossing he perceives a pull back to the first adjustment axis. Due to the fact that the target position is shifted in the adjustment direction (i.e. along the second adjustment axis), this threshold can be avoided. When crossing the first adjustment axis, the control unit can specify the target position in a specified range around the first adjustment axis in such a way that the second total component maintains its sign and is greater than zero. For fixing the range, e.g. a threshold value can be fixed for each adjustment axis.

Thus, the actuating element can be adjusted along the second adjustment axis with a constant target position and can be guided circularly around the target position, without being without any restoring force along the second adjustment axis when crossing the first adjustment axis. These features and advantages can also be provided for both adjustment axes. Hence, the actuating element can likewise be adjusted along the first adjustment axis with a constant target position and can be guided circularly around the target position, without being without any restoring force along the first adjustment axis when crossing the second adjustment axis. Hence, interactions with the crossed adjustment axes, which are interspersed in the desired adjustment, can be avoided at both adjustment axes.

In one embodiment, the control unit is adapted and provided to vary an amount of the restoring force as a function of a distance of the actual position from the target position. For example, the function can be designed in such a way that an amount of the restoring force linearly rises with increasing distance of the actual position from the target position. The control unit hence can specify the amount of the restoring force in such a way that the at least one actuating drive simulates a mechanical spring via which the actuating element is (imaginarily) connected to the target position. Moreover, the (imaginary) mechanical spring can have an arbitrary spring characteristic. In particular, an arbitrary spring constant of the (imaginary) mechanical spring can be simulated. Beside the possibility that the amount of the restoring force increases linearly with the distance of the actual position from the target position (linear spring characteristic), the amount alternatively can rise in an arc-shaped manner (progressive or degressive spring characteristic). It is likewise conceivable and possible that the control unit is adapted and provided to specify a constant amount of the restoring force as a function of the distance of the actual position from the target position. Such a behavior can at best be achieved approximately by pretensioned mechanical springs. Varying the amount of the restoring force can be realized for example by specifying the above-described proportionality factor.

In one embodiment, a receiving unit is provided for receiving a control specification and/or a status information on a status of an object to be controlled, wherein the control unit is adapted and provided to specify the target position and/or the restoring force as a function of the control specification and/or the status information. The receiving unit hence can enable the device to adapt the specifications of the control unit to arbitrary data such as control specifications of a game software or a simulation program or to physical states of the object to be controlled, which were determined e.g. via sensors on the object to be controlled or by telemetry. Concretely, a restoring force of higher amount can be specified for example when an avatar of the user utilizes an improved tool in a game software. In a simulation software, physical properties such as for example a stall of a simulated aircraft can be used to make a simulated physical action of a succeeding flight path on aileron and elevator haptically reproducible at the actuating element. Likewise, the real physical states of the object to be controlled can be made haptically reproducible (for example by suddenly shifting the target position including an increase of the restoring force at the onset of wind). Moreover, the target position can be specified by or in combination with a control specification of another device (e.g. another remote control) or an Internet stream of movement data.

In one embodiment, there is provided an evaluation unit which is adapted and provided to evaluate a plurality of actual positions preceding the actual position in order to determine a movement pattern on the basis of which the control unit is adapted and provided to specify the target position and/or an amount of the restoring force. Hence it is possible to not only use the actual position and based thereon determine the target position in a functional dependence, but in addition to evaluate a plurality of actual positions preceding the actual position. When the movement pattern for example indicates that the user adjusts the actuating element on a circular path around the target position, the target position can be shifted when crossing an adjustment axis through the actuating element in the direction of the adjusting movement, so that the user perceives a restoring force in the direction of the adjusting movement when crossing the adjustment axis. In principle, arbitrary movement patterns can be defined, on detection of which a specification of the target position and/or an amount of the restoring force is effected.

In one embodiment, the specification of the target position and/or the restoring force as a function of time by the control unit comprises a periodic dependence on the time. For example, the amount of the restoring force can vary according to a trigonometric function with a frequency Omega and an amplitude A. The user can perceive such a variation as a vibration on the actuating element. The specification of the target position and/or the restoring force as a function of time can be used for example to improve a game experience of the user in a game software or to provide the user of the device with an indication of an event in the simulation software or at the object to be controlled.

In one embodiment, the at least one actuating drive includes a brushless electric motor. Such electric motors are also referred to as permanently excited three-phase synchronous motors. They are characterized by their compact construction, their low weight, a precise and energy-efficient actuability and a low wear in operation. What is particularly suitable is an external rotor motor, because large torques can be generated thereby, as they may be required in the present device. The actuating element can be directly and in particular rigidly connected to a rotor of the brushless electric motor so that the device is compact and a direct transmission of torques from the actuating drive to the actuating element can be effected. A connection of the actuating element to the actuating drive via a shaft likewise is conceivable and possible. However, an interposed transmission is not provided.

In an embodiment, the at least one actuating drive comprises a first permanently excited three-phase synchronous motor which is adapted and provided to generate a rotary movement with respect to a first adjustment axis for generating the restoring force, and a second permanently excited three-phase synchronous motor which is adapted and provided to generate a rotary movement with respect to a second adjustment axis. The second adjustment axis can be arranged orthogonally to the first adjustment axis. A description of the operation of the at least one actuating drive in the form of a permanently excited three-phase synchronous motor is indicated in DE 10 2016 222 231 B3, whose paragraphs [0020] to [0026] and [0031] to are included herein by reference.

According to a second aspect of the disclosure, the object is achieved by a method for generating control signals, comprising the steps of a) adjusting an actuating element for generating a control signal along at least one adjustment direction into an actual position of a plurality of adjustment positions, b) specifying a target position and/or a restoring force as a function of one or more of an adjustment speed of the actuating element, an acceleration of the actuating element, at least one actual position preceding the actual position, a distance between the actual position and a nearest target position candidate from a field of target position candidates and/or the actual position, wherein the specifying of the target position and/or the restoring force as function of the actual position additionally depends on a proportionality factor whose own value is dependent on the actual position, and c) applying, by means of at least one actuating drive, the restoring force onto the actuating element at the actual position in the direction of the target position.

Specifying the target position and/or the restoring force can be accomplished additionally as a function of time.

The features and advantages described in connection with the first aspect of the disclosure can be used to develop the method according to the second aspect of the disclosure.

BRIEF DESCRIPTION OF THE FIGURES

The idea of the disclosure will be explained in more detail below with reference to the Figures, in which.

DETAILED DESCRIPTION

Figure 1:
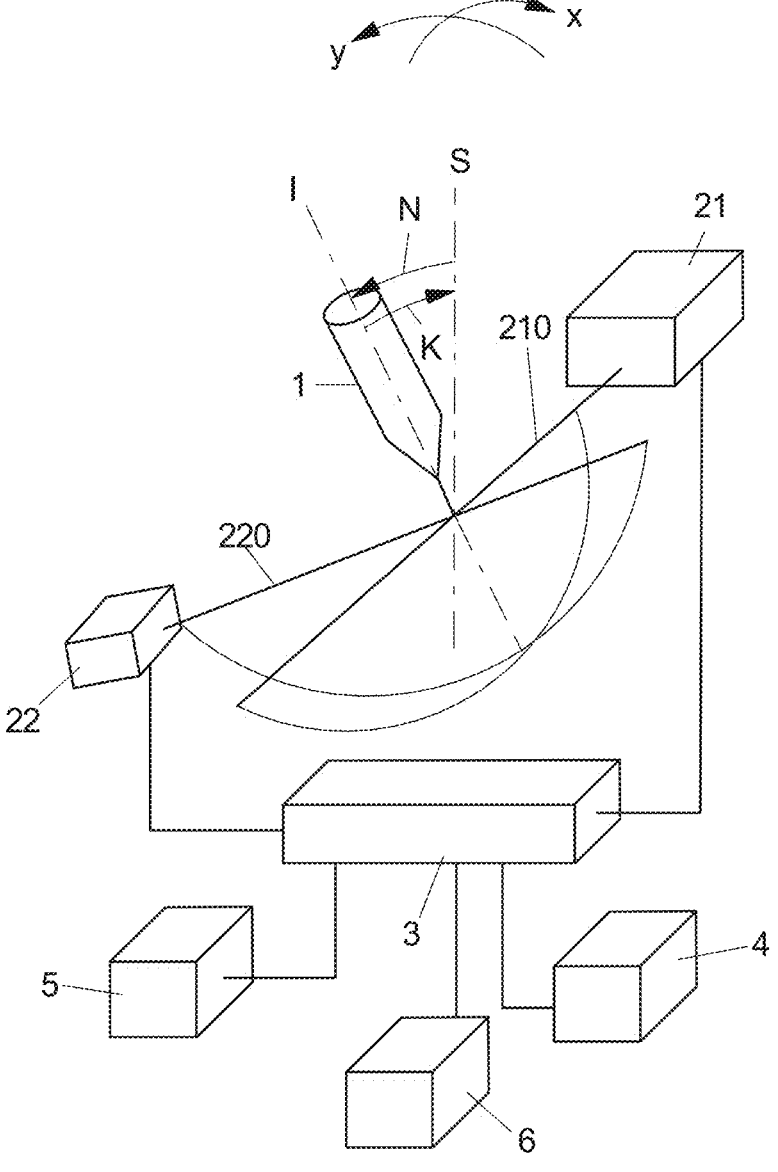
FIG. 1 shows a view of a device for generating control signals.

FIG. 1 shows a view of a device for generating control signals with an actuating element 1 which for generating a control signal is adjusted along an adjustment direction into an adjustment position. The adjustment position can be taken for example due to an adjusting force in the form of a user force N applied by a user onto the actuating element 1. This adjustment position corresponds to the actual position I of the actuating element 1. The actual position I deviates from the target position S which is arranged in the center of an adjustment range of the actuating element. In principle, the target position S can be arranged at an arbitrary adjustment position of the actuating element 1.

The device furthermore includes two actuating drives 21, 22 which are adapted and provided to apply a restoring force K onto the actuating element 1 at the actual position I in the direction of the target position S specified by a control unit 3. The control unit 3 therefor is coupled with the actuating drives 21, 22. The actuating drives 21, 22 are brushless electric motors.

The actuating element 1 is coupled with each of the actuating drives 21, 22 via a shaft 210, 220. Via the shafts 210, 220 the actuating element 1 is adjustable by pivoting along two adjustment axes x, y in the manner of a gimbal construction. The actuating element 1 hence is adjustable along an adjustment range on a spherical portion. The two adjustment axes x, y here are orthogonal to each other. Other constructions, which provide for an adjustability of the actuating element, likewise are conceivable and possible.

The control unit 3 is adapted and provided to specify the target position S and/or an amount of the restoring force K as a function of one or more of an adjustment speed v of the actuating element 1, an acceleration of the actuating element 1, at least one actual position preceding the actual position I, a distance between the actual position I and a nearest target position candidate from a field of target position candidates, the actual position I, wherein the specification additionally depends on a proportionality factor whose own value is dependent on the actual position I, and/or the time t.

In addition, a receiving unit 4 coupled with the control unit 3 is provided for receiving a control specification and/or a status information on a status of an object to be controlled, wherein the control unit 3 is adapted and provided to specify the target position S and/or the restoring force K as a function of the control specification and/or the status information.

Furthermore, an evaluation unit 5 is coupled with the control unit 3. The evaluation unit 5 is adapted and provided to evaluate a plurality of actual positions I preceding the actual position I in order to determine a movement pattern on the basis of which the control unit 3 is adapted and provided to specify the target position S and/or the restoring force K. For this purpose, the actual positions I are provided to the evaluation unit 5. Alternatively or additionally, the evaluation unit 5 can include a measuring device and optionally a memory device 6. By means of the measuring device an adjustment path (including the position, speed and/or acceleration) can be measured so that the same can be evaluated e.g. by healthcare professionals. By means of the memory device 6 a measured adjustment path can be stored as a reference path. The control unit 3 can be adapted and provided to specify the target position and/or the restoring force in dependence on a reference path. The memory device 6 also can be adapted and provided to store one or more proportionality factors which are associated to adjustment positions.

Figure 2A:
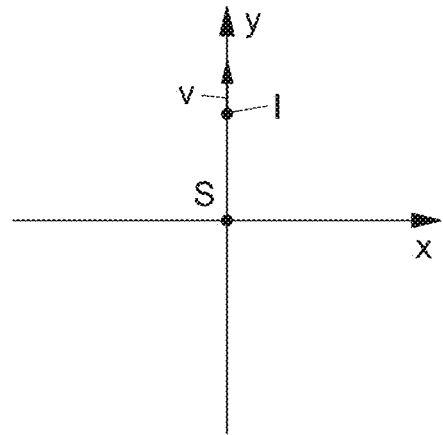
FIGS. 2A and 2B each show a schematic representation of a specification of a target position as a function of the adjustment speed.

FIG. 2A shows two orthogonal adjustment axes x, y which define an adjustment range within which the actuating element 1 can be adjusted. A target position S is specified by a non-illustrated control unit 3 at the origin of the adjustment axes x, y. The actuating element 1 is adjusted into an actual position I which is spaced apart from the target position S. The actual position I and the target position S are arranged on an y-axis of the two adjustment axes x, y so that their x-components are identical. Moreover, the actuating element 1 is moved away from the target position S with an adjustment speed v. An x-component of the adjustment speed v is zero (or close to zero within a specified threshold range). This means that the adjusting movement is effected along the y-axis. In such a situation, the control unit 3 is adapted and provided to maintain the target position S. The same analogously applies for an adjusting movement along the x-axis.

Figure 2B:
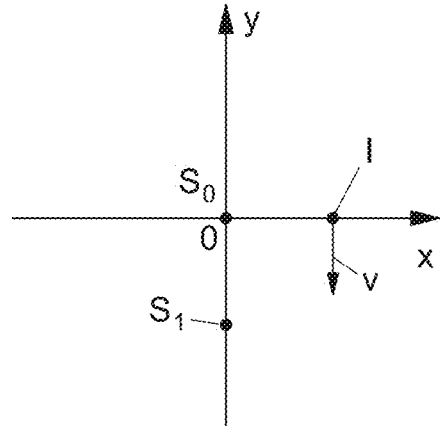

FIG. 2B likewise shows two orthogonal adjustment axes x, y, wherein the actual position I and the target position S0 are arranged on the x-axis so that their y-components are the same (namely equal to zero or almost zero within a specified threshold range). The x-component of the adjustment speed v of the actuating element 1 is zero (or close to zero within a specified threshold range). The adjustment therefore is effected along the y-axis. To avoid that in this situation a change is effected from a total restoring force with a negative y-force component in the direction of the x-axis on crossing the x-axis via a disappearance of the y-force component to a positive x-force component after crossing the x-axis, the target position S is shifted along the adjustment direction, i.e. along the y-axis. It thereby is avoided that the total restoring force "takes a turn" on crossing of the x-axis along the y-axis. As soon as the x-component of the adjustment speed again is different from zero in the course of the adjusting movement continued after the crossing of the x-axis, the shifted target position S can again be shifted back into the origin. Due to such a specification of the target position as a function of the adjustment speed, an undesired imbalance during the adjusting movement through one of the adjustment axes can be avoided in particular at constantly high restoring forces. The specification can be further improved e.g. by additionally taking account of a movement history.

Figure 3:
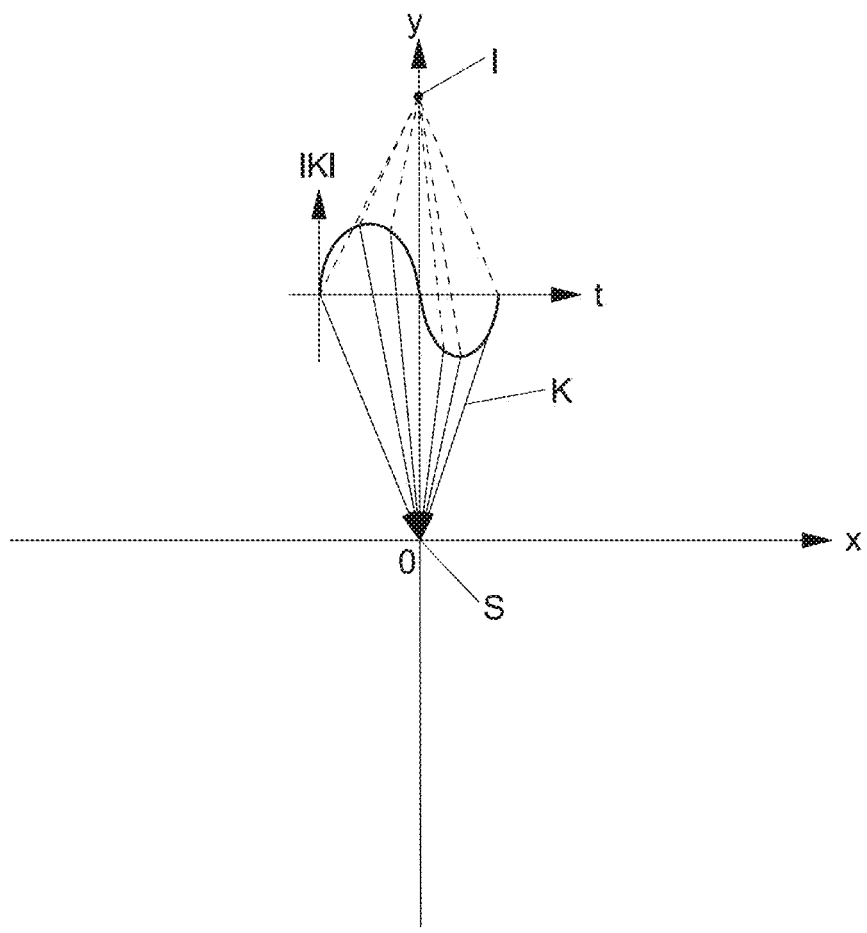
FIG. 3 shows a schematic representation of a specification of a restoring force as a function of time.

FIG. 3 shows two orthogonal adjustment axes x, y in which the target position S is arranged in the origin, by way of example. The actuating element 1 is shifted to the actual position I relative to the target position S. A restoring force K is applied onto the actuating element 1 in the direction of the target position S. Moreover, the control unit 3 specifies an amount of the restoring force K as a function of the time t. For illustration, the force vector of the restoring force K is fanned out into a plurality of force vectors K whose direction from the actual position I to the target position S should be identical, but whose amount periodically varies over the time t. During a first time period, the restoring force K accordingly is stronger than in a second time period and subsequently again equal to the first time period. A user who holds the actuating element 1 at the actual position I via an adjusting force applied manually, for example, perceives the variation with the time t as a vibration in the direction of the target position S. In principle, the direction of the vibration can be arbitrary and likewise vary with the time t.

Figure 4:
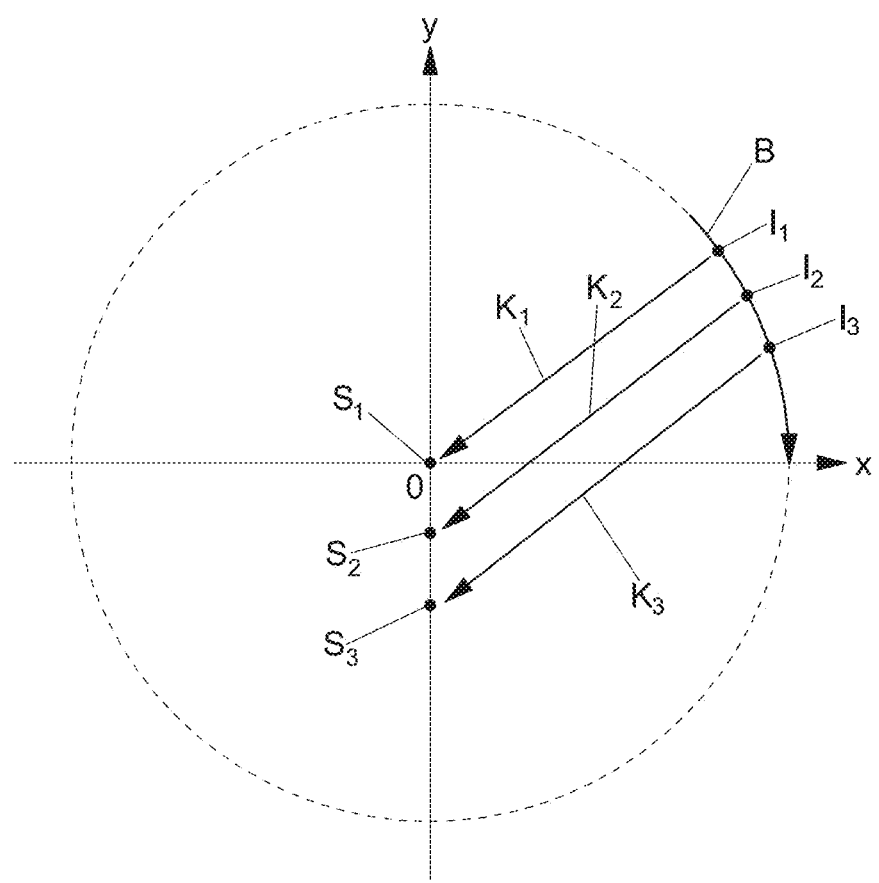
FIG. 4 shows a schematic representation of a specification of a target position as a function of preceding actual positions.

FIG. 4 shows two orthogonal adjustment axes x, y relative to which an adjustment path B of the actuating element 1 is indicated along an adjustment axis. The adjustment path B is extended along a circular segment around the origin 0 of the adjustment axes x, y. On the adjustment path B a first, a second and a third actual position I1, I2, I3 are arranged. The third actual position I3 is the current actual position of the actuating element 1. The two actual positions I1, I2 preceding the current actual position I3 are evaluated by a (non-illustrated) evaluation unit in order to determine a movement pattern. In this case, the evaluation unit determines the adjustment path B as a movement pattern, which is extended along a circle. On the basis of the adjustment path B the control unit 3 can specify the target position. The determination of such a movement history in the form of the adjustment path B can be based on an arbitrary number of preceding actual positions I1, I2.

What is shown by way of example is a displacement of the target position from the original target position S1 in the origin of the adjustment axes x, y along the y-axis in the direction of the adjusting movement. With the approach of the actuating element 1 to the x-axis, the target position S1 therefore is shifted away from the x-axis to the target position S2 and the target position S3. A sudden decrease of the y-force component of the total restoring force and a subsequent sudden increase of the y-force component in the opposite direction thereby is avoided. Rather, the respective vector of the total restoring force K1, K2, K3 always includes an y-component different from zero. When operating the actuating element 1, the user experience thereby is improved.

LIST OF REFERENCE NUMERALS

1 actuating element
21, 22 actuating drive
210, 220 shaft
3 control unit
4 receiving unit
5 evaluation unit
6 memory device
B adjustment path
I, I1, I2, I3 actual position
K, K1, K2, K3 restoring force
N user force
S, S0, S1, S2, S3 target position
t time
v adjustment speed
x, y adjustment axis

The invention claimed is:

1. A device for generating control signals, comprising
an actuating element which for generating the control signals is adjustable along at least one adjustment direction into a plurality of adjustment positions,
at least one actuating drive which is adapted and provided to apply a restoring force onto the actuating element at an actual position in the direction of a target position specified by a control unit,
wherein
that the control unit is adapted and provided to specify the target position and/or the restoring force as a function of one or more of
an adjustment speed of the actuating element,
an acceleration of the actuating element,
at least one actual position preceding the actual position, a distance between the actual position and a nearest target position candidate from a field of target position candidates and/or the actual position, wherein specifying the target position and/or the restoring force as a function of the actual position additionally depends on a proportionality factor whose own value is dependent on the actual position.

2. The device according to claim 1, wherein the actuating element is adjustable within an adjustment range which is defined by two orthogonal adjustment axes.

3. The device according to claim 2, wherein for each adjustment axis an actuating drive is provided, which is adapted and provided to apply a restoring force onto the actuating element along the respective adjustment axis, so that a total restoring force is obtained in the direction of the target position specified by the control unit.

4. The device according to claim 3, wherein the actual position and the target position each include a first and a second position component along a first and a second adjustment axis, and the adjustment speed includes a first and a second speed component along the first and the second adjustment axis, wherein the control unit is adapted and provided to maintain the target position with a first speed component of zero, when the first position components of the actual and target positions are the same, and to specify a target position shifted along the second adjustment axis in the direction of the second speed component, when the second position components of the actual and target positions are the same.

5. The device according to claim 1, wherein the control unit is adapted and provided to vary an amount of the restoring force as a function of a distance of the actual position from the target position.

6. The device according to claim 1, comprising a receiving unit for receiving a control specification and/or a status information on a status of an object to be controlled, wherein the control unit is adapted and provided to specify the target position and/or the restoring force as a function of the control specification and/or the status information.

7. The device according to claim 1, comprising an evaluation unit which is adapted and provided to evaluate a plurality of actual positions preceding the actual position in order to determine a movement pattern on the basis of which the control unit is adapted and provided to specify the target position and/or the restoring force.

8. The device according to claim 1, wherein the control unit is adapted and provided to specify the target position and/or the restoring force as function of the time.

9. The device according to claim 8, wherein the specification as a function of the time comprises a periodic dependence on the time.

10. The device according to claim 1, wherein the at least one actuating drive includes a brushless electric motor.

11. The device according to claim 1, wherein the control unit is adapted and provided to reduce the restoring force in response to the determination of a constant acceleration of the actuating element.

12. A method for generating control signals, comprising adjusting an actuating element for generating a control signal along at least one adjustment direction into an actual position of a plurality of adjustment positions, specifying a target position and/or a restoring force as function of one or more of an adjustment speed of the actuating element, an acceleration of the actuating element, at least one actual position preceding the actual position, a distance between the actual position and a nearest target position candidate from a field of target position candidates and/or the actual position, wherein the specifying of the target position and/or the restoring force as function of the actual position additionally depends on a proportionality factor whose own value is dependent on the actual position, and applying, by means of at least one actuating drive, the restoring force onto the actuating element at the actual position in the direction of the target position.

* * * * *